(12) United States Patent
Yamaka

(10) Patent No.: US 6,367,973 B2
(45) Date of Patent: Apr. 9, 2002

(54) PROBE COVER DETACHING MECHANISM AND EAR TYPE CLINICAL THERMOMETER

(75) Inventor: Masataka Yamaka, Fuji (JP)

(73) Assignee: Terumo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/819,805

(22) Filed: Mar. 29, 2001

Related U.S. Application Data

(63) Continuation of application No. PCT/JP99/05337, filed on Sep. 29, 1999.

(30) Foreign Application Priority Data

Sep. 29, 1998 (JP) .............................................. 10-291557

(51) Int. Cl.[7] .......................... G01K 1/08; G01J 5/002; A61B 1/227
(52) U.S. Cl. ...................... 374/158; 374/121; 374/209; 600/474; 600/186; 600/203
(58) Field of Search ................. 374/158, 121, 374/209; 600/474, 549, 184, 186, 200, 203; 206/306

(56) References Cited

U.S. PATENT DOCUMENTS

| | | | | |
|---|---|---|---|---|
| 3,832,669 A | * | 8/1974 | Mueller et al. ............. | 206/306 |
| 3,833,115 A | * | 9/1974 | Schapker .................... | 374/158 |
| 3,929,018 A | * | 12/1975 | Turner ........................ | 374/158 |
| 4,054,057 A | * | 10/1977 | Kluge ......................... | 374/158 |
| 4,112,762 A | * | 9/1978 | Turner et al. ................ | 206/306 |
| 4,366,811 A | * | 1/1983 | Riester ........................ | 600/200 |
| 4,863,281 A | * | 9/1989 | Suszynski .................... | 374/158 |
| 5,487,607 A | * | 1/1996 | Makita et al. ............... | 374/158 |

FOREIGN PATENT DOCUMENTS

| | | | |
|---|---|---|---|
| EP | 565123 A1 | * | 10/1993 |
| JP | 4-95005 | | 8/1992 |
| JP | 6-98861 | | 4/1994 |

* cited by examiner

Primary Examiner—Diego Gutierrez
Assistant Examiner—Stanley J. Pruchnic
(74) Attorney, Agent, or Firm—Burns, Doane, Swecker & Mathis, LLP

(57) ABSTRACT

A probe cover detaching mechanism for detaching a probe cover mounted to abut against a probe that is to be inserted into the earhole from the probe includes an operating member to which is applied an operating force for detaching the probe cover from the probe, a push member pushing the probe cover toward the distal end of the probe upon receipt of the operating force applied to the operating member and transmitted from the operating member, and a mechanism joining the operating member with the push member and changing the direction of the operating force applied to the operating member by substantially 90° so as to transmit the operating force to the push member.

12 Claims, 7 Drawing Sheets

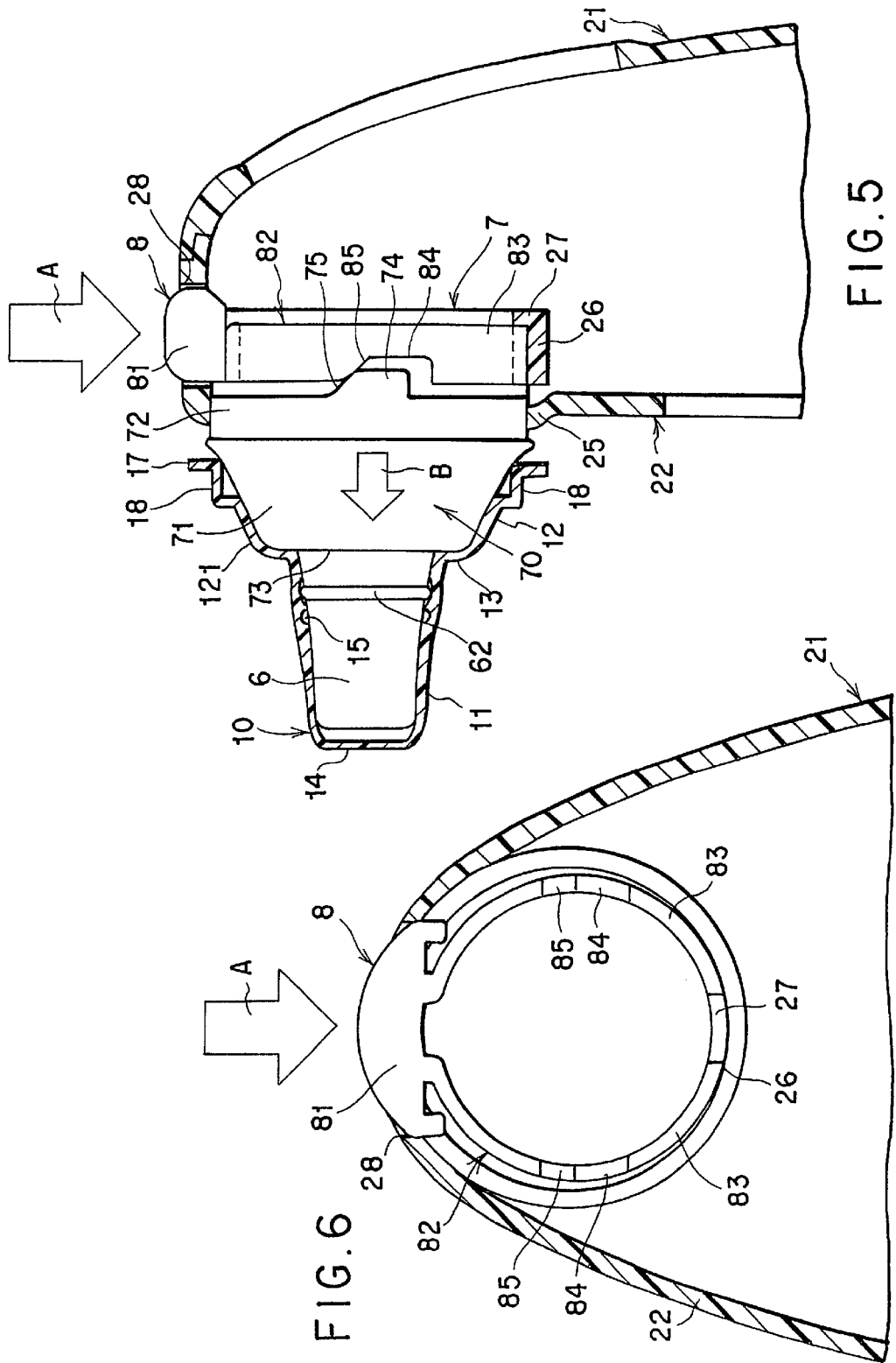

PROBE COVER DETACHING MECHANISM AND EAR TYPE CLINICAL THERMOMETER

CROSS-REFERENCE TO RELATED APPLICATIONS

This is a Continuation Application of PCT Application No. PCT/JP99/05337, filed Sep. 29, 1999, which was not published under PCT Article 21(2) in English.

This application is based upon and claims the benefit of priority from the prior Japanese Patent Application No. 10-291557, filed Sep. 29, 1998, the entire contents of which are incorporated herein by reference.

BACKGROUND OF THE INVENTION

The present invention relates to a probe cover detaching mechanism for detaching a probe cover mounted to a probe of an ear type clinical thermometer and an ear-type clinical thermometer comprising the probe cover detaching mechanism.

An ear type clinical thermometer has been developed as a clinical thermometer for measuring the body temperature in the medical institution such as a hospital and at home. The ear type clinical thermometer comprises a projection-like probe (infrared ray intake portion) that is inserted into the earhole (external auditory miatus). The infrared ray (heat ray) radiated from and around the eardrum is taken into the clinical thermometer through the probe and detected by a sensor housed in the body of the clinical thermometer. The intensity of the detected infrared ray corresponds to the body temperature. The ear type clinical thermometer of this type permits measuring the body temperature in such a short time as about 1 to 2 seconds and, thus, is greatly advantageous in the case of measuring the body temperature of, particularly, a suckling and an infant who are unable to withstand a long waiting time.

In the ear type clinical thermometer, the probe is not directly inserted into the earhole, and the probe is covered with a resin probe cover that is discarded after the use in view of, particularly, the sanitation. After measurement of the body temperature, the probe cover is detached from the probe so as to be discarded.

The probe cover is shaped cylindrical to conform with the probe. The distal end of the probe cover that is inserted into the earhole is closed with a thin film through which the infrared rays can be transmitted, and the proximal end of the probe cover is open. The probe is inserted into the probe cover through the open proximal end of the probe cover.

Particularly, in a medical institution such as a hospital, it is required for the used probe cover not to be touched directly by hands and to be promptly detached from the probe mounted to the body of the clinical thermometer. Such being the situation, developed is a probe cover detaching mechanism that permits detaching the probe cover by a one-touch operation. The particular probe cover detaching mechanism is disclosed in, for example, U.S. Pat. No. 5,487,607.

Referring to FIGS. 10 and 11 that collectively show schematically the conventional probe cover detaching mechanism, the conventional probe cover detaching mechanism 30 comprises a pushing portion 31 arranged movable in an axial direction (longitudinal direction) of a probe 35 relative to a casing 34 of a clinical thermometer for pushing a probe cover 36, a push or press button 32 for pushing or pressing the probe cover 36, and a spring 33 for bringing the depressed push button 32 back to the original position.

After the probe 35 is covered with the probe cover 36, the probe 35 is pushed toward the distal end of the probe cover 36 so as to achieve, for example, a tight fit between the open portion at the proximal end of the probe cover 36 and the probe 35, thereby mounting fitting the probe cover 36 to the probe 35. At the same time, a flange portion 37 of the probe cover 36 is allowed to abut against the pushing member (see FIG. 10).

When the probe cover 36 is detached, the push button 32 is pushed or pressed in a direction denoted by an arrow C against the elastic force of the spring 33. As a result, the pushing member 31 is moved toward the distal end of the probe 35 so as to push the flange portion 37 of the probe cover 36 (see FIG. 11), thereby releasing the mounted state by, for example, the tight fit between the probe cover 30 and the probe 35 and allowing the probe cover 36 to rise up from the probe 35. In this fashion, the probe cover 36 can be manually detached easily from the probe 5.

Then, if the pushing force applied to the push button 32 is released, the push button 32 is brought back to the original position shown in FIG. 10 by the elastic force of the spring 33.

In the conventional probe cover detaching mechanism 30 of the construction described above, however, the moving direction of the pushing member 31 is equal to the pushing direction of the push button 32 denoted by the arrow C in FIG. 11. Therefore, it is necessary to arrange the push button 32 on the backside of the probe 35. In addition, it is necessary to arrange the entire detaching mechanism 30 in a manner to extend to reach the back surface of the casing 34. As a result, it is necessary to provide a mounting space of the push button 32 on the backside of the probe 35. In addition, a large mounting space is required. What should also be noted is that it is impossible to mount switches such as a measuring switch to a portion on the back surface of the casing 34 that corresponds to the probe 35, leading to restriction in the design. Also, the conventional probe cover detaching mechanism 30 cannot be handled easily.

Further, the conventional probe cover detaching mechanism 30 requires the spring 33 separately from the push button 32, leading to an increase in the number of parts required and to a troublesome assembling operation. This is clearly disadvantageous in the process of manufacturing the probe cover detaching mechanism.

An object of the present invention is to provide a probe cover detaching mechanism simple in construction, requiring a small mounting space, and permitting the probe cover to be detached from the probe easily and without fail, and an ear type clinical thermometer comprising the particular probe cover detaching mechanism.

BRIEF SUMMARY OF THE INVENTION

According to the present invention, the above object has been achieved by a probe cover detaching mechanism for detaching a probe cover mounted to abut against a probe that is to be inserted into an earhole from the probe, comprising an operating member to which is applied an operating force for detaching the probe cover from the probe; a push member which pushes the probe cover toward the distal end of the probe upon receipt of the operating force applied to the operating member and transmitted from the operating member; and a mechanism joining the operating member with the push member, the mechanism changing the direction of the operating force applied to the operating member by substantially 90° so as to transmit the operating force to the push member.

In a preferred embodiment of the present invention, the push member is mounted in an outer circumferential portion of the proximal end of the probe and movable in an axial direction of the probe.

In a preferred embodiment of the present invention, that portion of the push member which abuts against the probe cover is substantially in the shape of a truncated cone.

In a particularly preferred embodiment of the present invention, the transforming-transmitting mechanism of the operating force is constructed by a cam mechanism. It is desirable for the cam mechanism to be formed of a tapered cam plane formed in the operating member and an inclined plane formed in a push member and mating with the cam plane.

Further, in the present invention, it is desirable for the operating member to comprise a push button and a deforming section elastically deformed upon depression of the push button and to be constructed such that the push button is brought back to the original position by the elastic force of the deforming section. The deforming section can be formed of a pair of substantially semicircular arcuate plate pieces. Preferably, the push button and the deforming section are formed integral.

It is possible for the probe cover detaching mechanism of the present invention to comprise further an auxiliary means for increasing the moving amount of the push member. It is desirable for the auxiliary means to be constructed by a cam mechanism.

According to the present invention, there is also provided an ear type clinical thermometer comprising the probe cover detaching mechanism of the present invention. In the ear type clinical thermometer of the present invention, it is possible for a measuring switch to be mounted on the backside of the probe cover detaching mechanism.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 5 is a side view, partly broken away, showing the construction when the probe cover is detached from the probe cover detaching mechanism shown in FIG. 3;

FIG. 6 is a front view of the probe cover detaching mechanism shown in FIG. 5;

DETAILED DESCRIPTION OF THE INVENTION

Preferred embodiments of the probe cover detaching mechanism and the ear type clinical thermometer of the present invention will now be described in detail with reference to the accompanying drawings.

Figure 1:
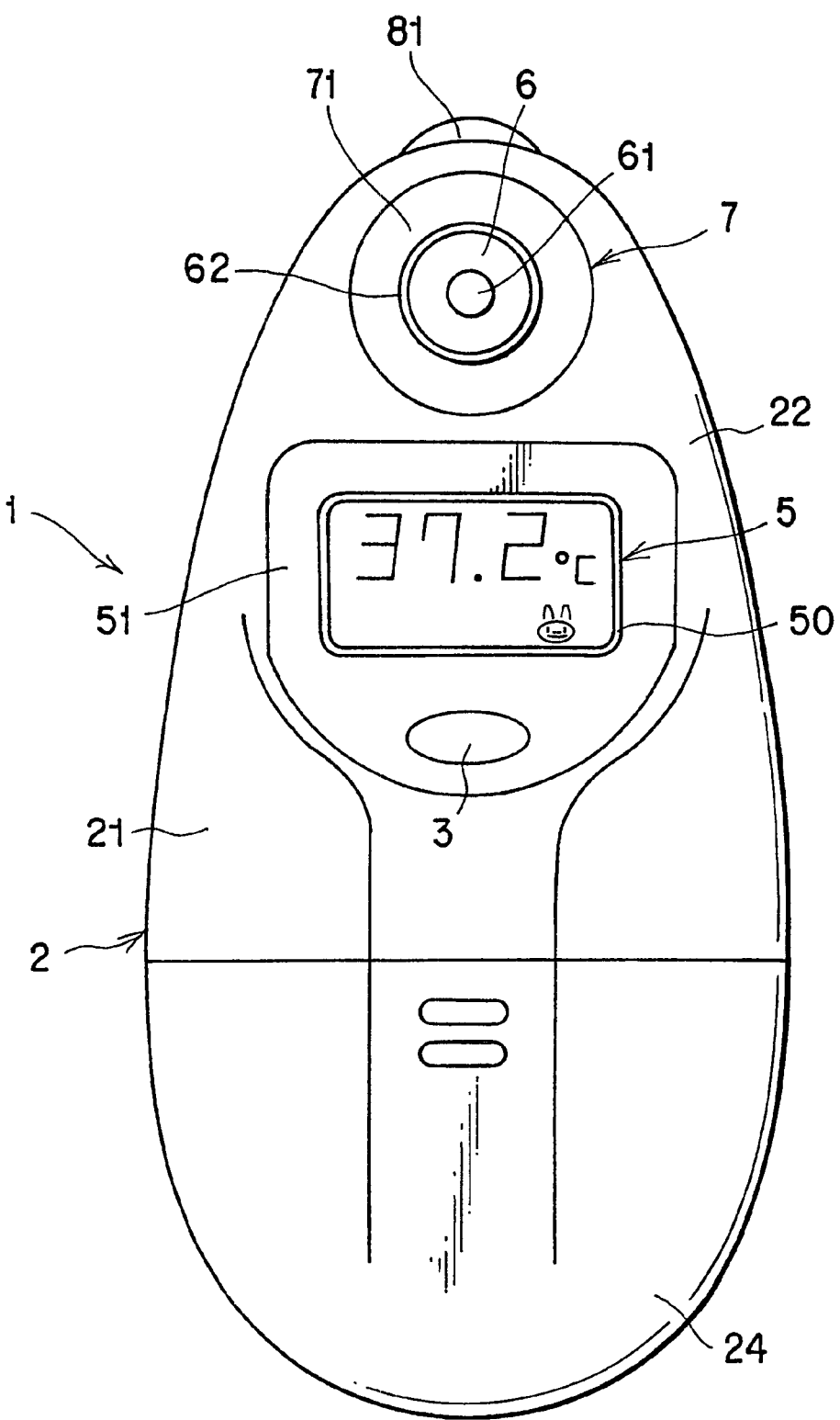
FIG. 1 is a front view showing an ear type clinical thermometer of the present invention.
Figure 2:
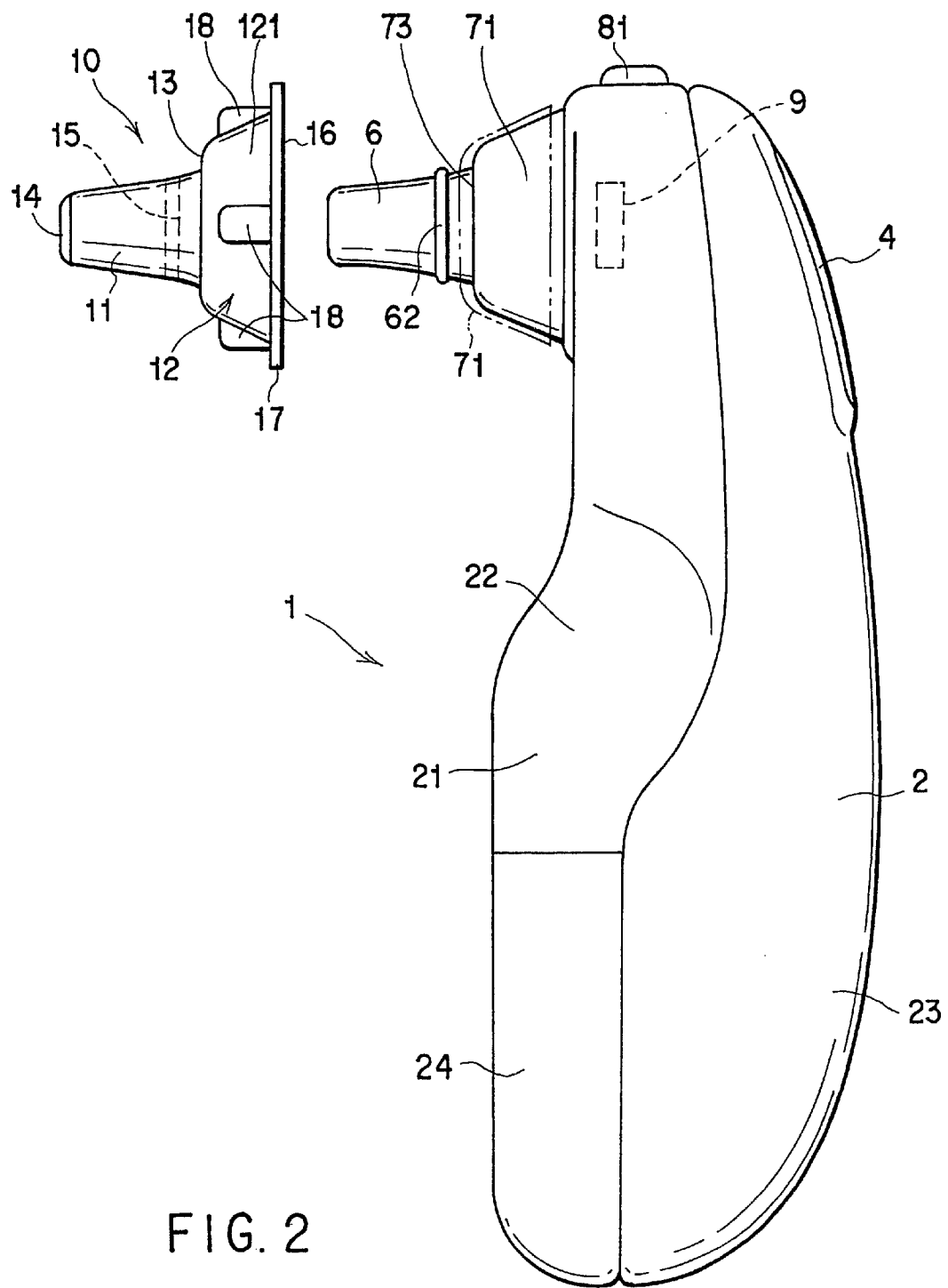
FIG. 2 is a side view showing the ear type clinical thermometer shown in FIG. 1.
Figure 3:
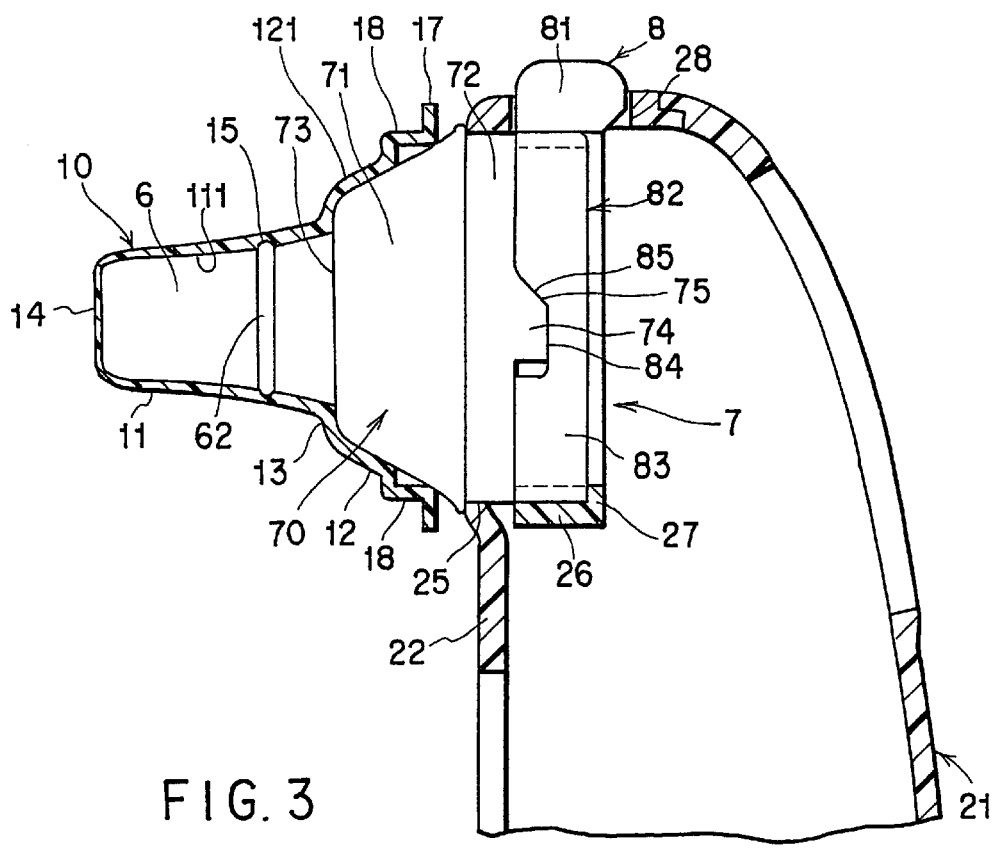
FIG. 3 is a side view, partly broken away, showing the probe cover detaching mechanism of the present invention in the state that the probe cover is mounted to a probe.

First of all, the ear type clinical thermometer according to a preferred embodiment of the present invention will now be described together with the probe cover detaching mechanism with reference to FIGS. 1 to 6. Incidentally, the upper and lower sides of FIGS. 1, 2, 3 and 5 are called upper portions and lower portions, respectively, in the following description for the sake of convenience in description. Also, the left sides of FIGS. 2, 3 and 5 are called the front surfaces or distal ends, with the right sides being called the back surfaces or proximal ends.

The ear type clinical thermometer is an infrared clinical thermometer for measuring the body temperature by measuring the intensity of the infrared rays emitted from or around the eardrum.

The entire construction of the ear type clinical thermometer 1 according to a preferred embodiment of the present invention will now be described with reference to FIGS. 1 and 2. As shown in the drawing, the clinical thermometer 1 comprises a clinical thermometer body 2 housing a body temperature detecting section 9 (FIG. 2), a power switch 3 and a display section 5 (FIG. 1) mounted on the front surface of the clinical thermometer body 2, a measuring switch 4 (FIG. 2) mounted in an upper portion on the back surface of the clinical thermometer body 2, a probe 6 inserted into the earhole, and a probe cover detaching mechanism 7 for detaching a probe cover 10 from the probe 6.

The clinical thermometer body 2 comprises a casing 21. The casing 21 is constructed mainly by three members, a front casing member 22 positioned in the front portion of the casing 21, a back casing member 23 (FIG. 2) positioned on a back portion of the casing 21, and a lid member 24.

A window (opening) 50 for displaying the body temperature is formed on the front surface of the front casing member 22. A display device 5 (FIG. 1) formed of a liquid crystal display element (LCD) is arranged in the window 50 for displaying the measured body temperature and other information such as the remaining battery amount and the waiting time before the measurement. The window 50 is covered with a transparent plate 51 (FIG. 1).

The power switch 3 (FIG. 1) for turning on/off the power supply is arranged on the front surface of the front casing member 22.

The measuring switch 4 (FIG. 2) is arranged in an upper portion of the back casing member 23. The back casing member 23 is fixed stationary to the front casing member 22 by, for example, screws.

The lid member 24, which is detachably mounted to a lower portion of the front casing member 22, is opened or closed when a battery (not shown) is put into or renewed in a battery chamber (not shown) formed within the clinical thermometer body.

Housed in the casing 21 are the body temperature detecting section 9 as well as a micro computer (not shown) acting as a control means, a buzzer, etc., which are mounted on a circuit board. Incidentally, these members are omitted in FIGS. 3 to 6.

The probe 6 is mounted on the side of the front surface in an upper portion of the clinical thermometer body 2. As shown in FIG. 2 as well as in FIGS. 3 and 5, the probe 6 has a cylindrical shape whose outer diameter is gradually diminished toward the distal end. It is desirable for the outer circumferential portion at the distal end of the probe 6 (edge portion) to be roundish in view of the safety when the probe 6 is inserted into the earhole. Arranged inside the probe 6 is a light guide (a wave guide), which is not shown, for guiding the infrared rays (heat rays) introduced from the opening 61 at the distal end to an infrared ray sensor, e.g., a thermopile structure, included in the body temperature detecting section 9. An annular convex portion 62 is formed on the entire outer circumferential surface at the proximal end portion of the probe 6. When the probe cover 10 described herein later is mounted to the probe 6, an annular concave portion 15 formed in the inner circumferential surface of the probe cover 10 is engaged with the annular convex portion 62.

As shown in FIGS. 2, 3 and 5, the probe cover 10 comprises a cylindrical first portion (distal end portion) 11 covering the probe 6 and a second portion (proximal end portion) 12 positioned closer to the proximal end than the first portion 11 and having a diameter larger than that of the first portion 11. In a preferred embodiment of the present invention, a stepped portion 13 is formed at the boundary region between the first portion (distal end portion) 11 and the second portion (proximal end portion) 12.

The distal end portion 11 of the probe cover 10 is shaped like a cylinder having the outer diameter and the inner diameter that are gradually diminished toward the distal end to conform with the outer shape of the probe 6. The opening at the distal end of the distal end portion 11 is closed by a thin film 14. The thin film 14 is capable of transmitting the infrared rays emitted from within the ear.

An engaging section (fitting section) capable of engagement (fitting) with the annular convex portion 62 formed in the outer circumferential portion of the probe 6 is formed in the proximal end portion, i.e., in the vicinity of the stepped portion 13, of the distal end portion 11 of the probe cover 10. The engaging section is formed of an annular concave portion (groove) 15 formed in the inner circumferential surface 111 of the distal end portion 11. As described previously, the annular concave portion 15 is engaged with the annular convex portion 62 formed in the probe 6 when the probe cover 10 is mounted to the probe 6, thereby fixing the probe cover 10 to the probe 6 without fail. In this embodiment, the distal end portion 11 in which the annular concave portion 15 is to be formed is made relatively thick by the injection molding, etc. so as to form the annular concave portion 15 within the wall of the distal end portion 11 without forming a projecting portion on the outer circumferential portion of the distal end portion 11.

The annular concave portion 15 is formed over the entire inner circumferential surface of the distal end portion 11. Therefore, the annular concave portion 15 does not exhibit any directivity in respect of the circumferential direction. In other words, the annular concave portion 15 is capable of fitting with the annular convex portion 62 in any desired rotating direction (rotating angle) relative to the probe 6, thus making it possible to perform the mounting operation of the probe cover 10 to the probe 6.

Further, since the engaging section (annular convex portion 15) is formed in the distal end portion 11 of the probe cover 10, the distance between the engaging section and the infrared ray transmitting film 14 can be made shorter, compared with the case where the engaging section is formed in the proximal end portion 12. Therefore, when the probe cover 10 is mounted to the probe 6, the probe cover 10 abuts against the distal end of the probe 6. As a result, where tension is applied to the infrared ray transmitting film 14, it is possible to stretch the infrared ray transmitting film 14 uniformly with sufficient tension. Naturally, wrinkles or loosening does not take place in the infrared ray transmitting film 14 so as to permit the infrared rays to be transmitted uniformly through the film 14.

It is possible to form a plurality of annular convex portions 62 arranged apart from each other in the longitudinal direction of the probe 6. It is also possible to form a plurality of annular concave portions 15 in a manner to correspond to the annular convex portions 62 in the distal end portion 11 of the probe cover 10.

The proximal end portion 12 of the probe cover 10 is in the form of a truncated cone. In other words, the outer diameter and the inner diameter of the proximal end portion 12 are gradually diminished toward the distal end in a manner to conform with the outer shape of a probe cover abutting section or portion 71 of a pushing member 70 described herein later in detail. The proximal end of the proximal end portion 12 is open to form an opening 16, and a flange 17 is formed along the outer circumferential portion of the proximal end opening 16.

A plurality of projections 18 are formed along the circumferential direction in the outer circumferential surface (tapered surface) 121 of the proximal end portion 12 of the probe cover 10. In this embodiment, four projections 18 of the same shape are equidistantly formed, i.e., apart from each other by 90°, along the circumferential direction of the outer circumferential surface 121 of the proximal end portion 12. Where a large number of probe covers are superposed one upon the other for preservation, the spacer (projection 18) serves to prevent the adjacent probe covers from being tightly attached to each other, making it possible to separate and take out the probe cover 10 one by one without fail. It follows that the probe cover 10 can be mounted to the probe 6 easily. It should also be noted that, since the projection 18 protrudes outward from the outer circumferential surface 121 of the proximal end portion 12, the projection 18 does not abut against the outer circumferential surface of the probe cover abutting section 71, with the result that, when the probe cover 10 is mounted to the probe 6, the mounting is not inhibited by the projection 18.

When the probe cover 10 is mounted to the probe 6, the inner surface of the stepped portion 13 between the distal end portion 11 and the proximal end portion 12 of the probe cover 10 abuts against a distal end surface 73 of the pushing member 7.

It is possible to form the infrared ray transmitting film 14 and the body portion (the distal end portion 11 and the proximal end portion 12 including the stepped portion 13) by different members. However, where these two portions are fused together or integrally formed, it is desirable to form these two portions by the same material. Therefore, it is desirable to use resin materials capable of transmitting the infrared rays such as polyethylene or polypropylene for forming these two portions. Also, the thickness of the body portion including the distal end portion 11 and the proximal end portion 12 is suitably set to enable the body portion to exhibit a sufficient hardness and a reasonable flexibility such that the body portion can be engaged with and detached from the probe 6.

Incidentally, the relative ratio of the thickness of the infrared ray transmitting film 14 of the probe cover 10 to the size of the entire probe cover 10, the relative ratio of the thickness of the body portion of the probe cover 10 to the size of the entire probe cover 10, and relative ratio of the depth of the concave portion 15 of the probe cover 10 to the size of the entire probe cover 10 are not limited to those shown in FIGS. 3 and 5.

The probe cover detaching mechanism will now be described in detail. In principle, the probe cover detaching mechanism of the present invention comprises an operating member to which is applied an operating force for detaching the probe cover from the probe, and a pushing member for pushing the probe cover toward the distal end of the probe upon receipt of the operating force applied to the operating member and transmitted from the operating member. The operating member is joined to the pushing member via a mechanism for changing the direction of the operating force applied to the operating member by substantially 90°.

The probe cover detaching mechanism 7 according to a preferred embodiment of the present invention, which is shown in FIGS. 3 to 6, comprises a pushing member 70 abutting against the proximal end portion 12 of the probe cover 10 and pushing the probe cover 10 toward the distal end of the probe 6 and an operating member 8 for moving the pushing member 70 in the axial direction of the probe 6. In this embodiment, the pushing member 70 and the operating member 8 are joined to each other via a cam mechanism described herein later.

The pushing member 70 comprises the probe cover abutting portion or section 71 abutting against the proximal end portion 12 of the probe cover 10 and a cylindrical portion or section 72 positioned closer to the proximal end than the probe cover abutting portion 71. It is desirable for the probe cover abutting portion 71 and the cylindrical portion 72 to be formed integral in order to decrease the number of parts forming the probe cover detaching mechanism.

The probe cover abutting portion 71 is formed of a hollow member substantially shaped like a truncated cone such that the outer diameter of the hollow member is gradually diminished toward the distal end, and is exposed from the outer front surface of the casing 21. The proximal end portion of the probe 6 is inserted into the probe cover abutting portion 71.

The distal end surface 73 of the probe cover abutting portion 71 forms a substantially flat plane. When the probe cover 10 is fitted over the probe 6, the inner surface of the stepped portion 13 of the probe cover 10 abuts against the distal end surface 73 noted above. When the probe 6 covered with the probe cover 10 is inserted into the earhole, the stepped portion 13 abuts against the region in the vicinity of the entrance to the earhole so as to regulate the insertion depth of the probe 6 into the earhole at a predetermined depth. Therefore, the measuring error caused by the change in the insertion depth of the probe 6 into the earhole can be prevented so as to permit the body temperature to be measured under optimum conditions. It is also possible to prevent an inconvenience that damage is done to the deep portion of the ear by the probe 6 excessively inserted into the earhole.

The cylindrical portion 72 of the pushing member 70 is inserted into a circular opening 25 formed in an upper portion of the front casing 22 so as to be positioned within the casing 21. The outer circumferential surface of the cylindrical portion 72 included in the pushing member 70 is slidable along the inner circumferential surface of the opening 25 so as to permit the pushing member 70 to be moved in the axial direction of the probe 6.

The proximal end surface of the cylindrical portion 72 of the pushing member 70 has a pair of projections 74 each having an inclined surface 75 and each being shaped like substantially a right-angled trapezoid and forming a cam mechanism.

On the other hand, the operating member 8 comprises a push or press button 81 depressed in a direction denoted by an arrow A in FIG. 6 by the operating force applied by, for example, a finger and a deforming section 82 that is elastically deformed by the depression of the push button 81. It is desirable for the push button 81 and the deforming section 82 to be formed integrally in order to decrease the number of parts of the probe cover detaching mechanism.

The push button 81 protrudes outside the casing 21 through an opening 28 formed within the upper end wall of the front casing 22.

Figure 4:
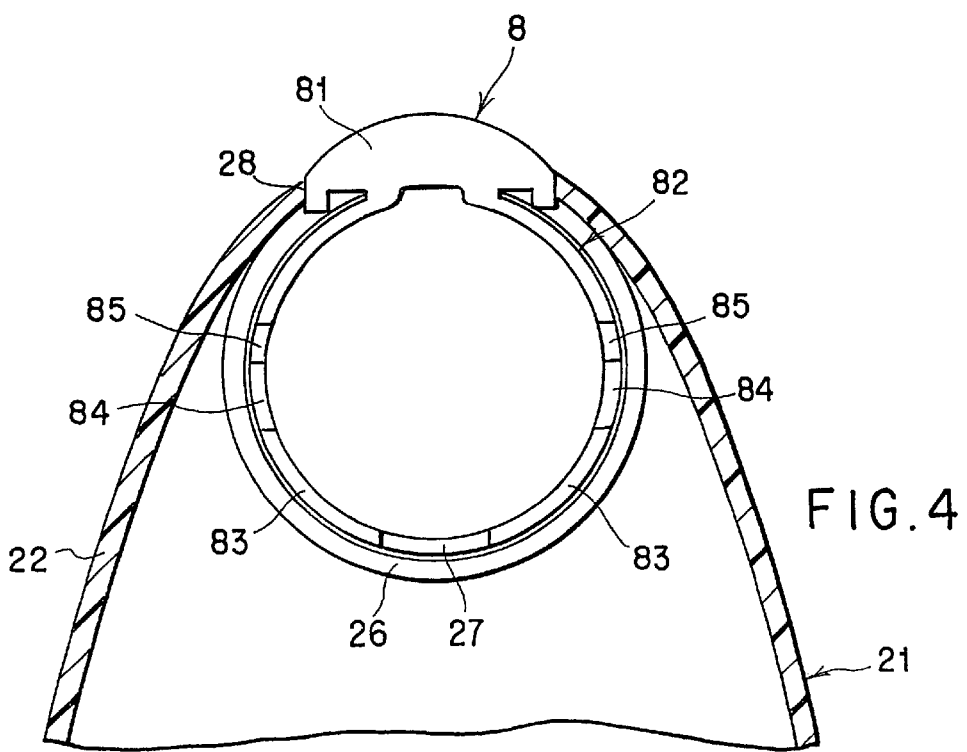
FIG. 4 is a front view of the probe cover detaching mechanism shown in FIG. 3.

As shown most clearly in FIGS. 4 and 6, the elastic deforming section 82 is formed of a pair of elastically deformable plate pieces 83 housed inside a cylindrical support member 26 arranged within the clinical thermometer body 2 and each bent in an arcuate form. The upper ends of these plate pieces 83 are joined to the lower surface of the push button 81 and, thus, the plate pieces 83 are made integral with the push button 81. Under the free state that the operating force is not applied to the deforming section 82, the lower free ends of these two plate pieces 83 are positioned a predetermined distance apart from each other. When the operating force, i.e., force for depressing the push button 81, is applied to the push button 81, the two plate pieces 83 are deformed to permit the free lower ends thereof to abut against each other. If the operating force is released, the elastic force (restoring force) of the two plate pieces 83 brings the push button 81 back to the original position.

An annular rib 27 projecting inward the support member 26 is formed along the inner circumference of the support member 26 in the proximal end portion of the support member 26 (see FIG. 3, too). The proximal end surfaces of the two plate pieces 83 abut against the side surface of the annular rib 27 so as to inhibit the movement of the plate pieces 83 toward the proximal end.

The deforming section 82 (plate pieces 83) is arranged to surround the temperature detecting section 9 or the optical guide of the infrared rays ranging between the proximal end portion of the probe 6 and the temperature detecting section 9 so as not to be a hindrance to the arrangement of the temperature detecting section 9 or the optical guide of the infrared rays.

A recessed portion 84 forming a cam mechanism is formed in the distal end surface of each of the plate pieces 83 (or front side in each of FIGS. 4 and 6). The recessed portion 84 has a depth substantially equal to the height of the right-angled trapezoidal projection 74 formed in the cylindrical portion 72 of the pushing member 70 and includes a tapered cam surface 85 formed in an upper portion and mating with the inclined surface 75 of the cylindrical portion 72.

The projection 74 formed in the cylindrical portion 72 of the pushing member 70 is inserted into the corresponding recessed portion 84 such that the inclined surface 75 is mated with the cam surface 85 and the proximal end surface of the cylindrical portion 72 abuts against the distal end surface of the plate piece 83 so as to achieve the engagement. If the push button 81 is depressed downward as denoted by the arrow A in FIGS. 5 and 6, the two plate pieces 83 are deformed so as to permit the cam surface 85 to be moved downward. As a result, the projection 74 is slid along the cam surface 85 via the inclined surface 75, thereby moving the pushing member 70 toward the distal end as denoted by an arrow B in FIG. 5. In other words, the projection 74 and the recessed portion 84 collectively form a cam mechanism for converting the displacement of the deforming portion 82 caused by the operation of the operating member 8 into the movement of the pushing member 70 toward the distal end.

As described above, in the probe cover detaching mechanism 7, the pushing direction of the push button 81 is substantially perpendicular to the moving direction of the push member 70, making it possible to mount the push button 81 in the upper end of the clinical thermometer body 2. Therefore, the operating member 8 does not occupy a large space on the backside of the probe 6 and, thus, the measuring switch 4 can be mounted in the upper portion on the back surface of the clinical thermometer body 2. As a result, these plural functional members such the button and the switch can be arranged in a concentrated fashion in the vicinity of the upper portion of the clinical thermometer body 2, leading to a good operability of the clinical thermometer. Also, since the probe cover detaching mechanism 7 can be formed of the two members, i.e., the pushing member 70 and the operating member 8, the mechanism 7 is small in the number of parts used, is simple in construction, necessitates a small mounting space, and can be assembled easily.

The pushing member 70 can be formed of a general resin material (high molecular compound material) such as an olefin-based resin, a styrene-based resin or an acetal resin. Particularly, it is desirable for the pushing member 70 to be formed of a resin having a high sliding property, particularly, AES (acrylonitrile-ethylene propylene rubber-styrene), which is a styrene-based resin, or POM (polyoxymethylene), which is an acetal resin.

Also, the operating member 8, particularly, the two plate pieces 83, can be formed of a general resin material (high molecular compound material) capable of having a spring action such as an olefin-based resin, a styrene-based resin or an acetal resin. Particularly, it is desirable to use POM, which is an acetal resin, for forming the operating member 8.

It is also possible for the pushing member 70 and the operating member 8 to be formed of metallic material such as iron or an iron alloy, e.g., stainless steel, copper or a copper alloy, aluminum or an aluminum alloy, titanium or a titanium alloy.

The support member 26 can be formed of a general resin material (high molecular compound materials) such as an olefin-based resin, a styrene-based resin or an acetal resin. Particularly, it is desirable to form the support member 26 integrally with the front casing 22 by using an ABS resin, which is a styrene-based resin generally used for various purposes.

How to use the ear type clinical thermometer 1 will now be described.

In the first step, the ear type clinical thermometer 1 is manually held and the probe 6 is inserted into the probe cover 10. Under this condition, the probe cover 10 is depressed so as to permit the annular concave portion 15 of the probe cover 10 to be engaged with the annular convex portion 62 of the probe 6 so as to mount and fix the probe cover 10 to the probe 6. In this case, the probe cover 10 can be mounted and fixed without fail and with a high stability by the engagement between the annular convex portion 62 and the annular concave portion 15. By the pushing force in the step of mounting the probe cover 10, the pushing member 70 is pushed toward the proximal end so as to be moved to the position shown in FIG. 3.

Then, the operator turns on the power switch 3 of the ear type clinical thermometer 1 and, a predetermined time later, holds the clinical thermometer body 2 so as to push the probe 6 covered with the probe cover 10 into the earhole of the subject. Then, the measuring switch 4 is kept pushed for a predetermined time so as to measure the body temperature. To be more specific, the infrared rays (heat rays) radiated from the eardrum pass through the infrared ray transmitting film 14 so as to be introduced into the light guide. The infrared rays introduced into the light guide are repeatedly reflected from the inner surface of the light guide so as to irradiate the infrared ray sensor in the temperature detecting section 9.

The signal corresponding to the intensity of the infrared rays, which is generated from the temperature detecting section 9, is supplied to a micro computer so as to permit a predetermined arithmetic processing to be carried out within the micro computer and, thus, to obtain the body temperature. The body temperature thus obtained is displayed in the display section 5. After completion of the body temperature measurement, a buzzer is buzzed to indicate the completion of the body temperature measurement.

After completion of the body temperature measurement, the probe 6 covered with the probe cover 10 is withdrawn out from the earhole. It should be noted that, since the probe cover 10 is fixed without fail to the probe 6, the inconvenience does not take place that the probe cover 10 is released from the probe 6 so as to remain within the earhole.

In the next step, the push button 81 is depressed downward as denoted by the arrow A in FIGS. 5 and 6. As a result, the two plate pieces 83 forming the deforming section 82 are deformed (warped) to increase the curvature thereof so as to move downward the cam surface 85. In accordance with the downward movement of the cam surface 85, the inclined surface 75 of the projection 74 of the cylindrical portion 72 slides along the cam surface 85 mated with the inclined surface 75. As a result, the pushing member 70 is pushed toward the distal end as denoted by the arrow B in FIG. 5.

By the movement of the pushing member 70, the probe cover abutting portion 71 of the pushing member 70 pushes the proximal end portion 12 and the stepped portion 13 of the probe cover 10 in the same direction. As a result, the engagement between the annular concave portion 15 of the probe cover 10 and the annular convex portion 62 of the probe 6 is released, with the result that the probe cover 10 is pushed toward the distal end and the used probe cover 10 is detached from the probe 6. The used probe cover 10 thus detached is disposed of as a waste material.

Incidentally, when the push button 8 is depressed downward, the proximal end surfaces of the two plate pieces 83 are allowed to abut against the annular rib 27 of the support member 26 and, thus, the two plate pieces 83 are not moved toward the proximal end by the reaction of the force for pushing the pushing member 70 toward the distal end. It follows that the moving distance of the pushing member 70 toward the distal end is maintained constant. Incidentally, the downward movement of the push button 8 is limited by the mutual abutment of the lower free ends of the two plate pieces 83.

If the finger is released from the push button 81 so as to release the depressing force, the push button 81 is brought back to the original position by the elastic force (restoring force) of the plate piece 83. To be more specific, the operating member 8 is brought back to the original position shown in FIGS. 3 and 4.

For performing the next body temperature measurement, the operations described above are repeated.

Figure 7:
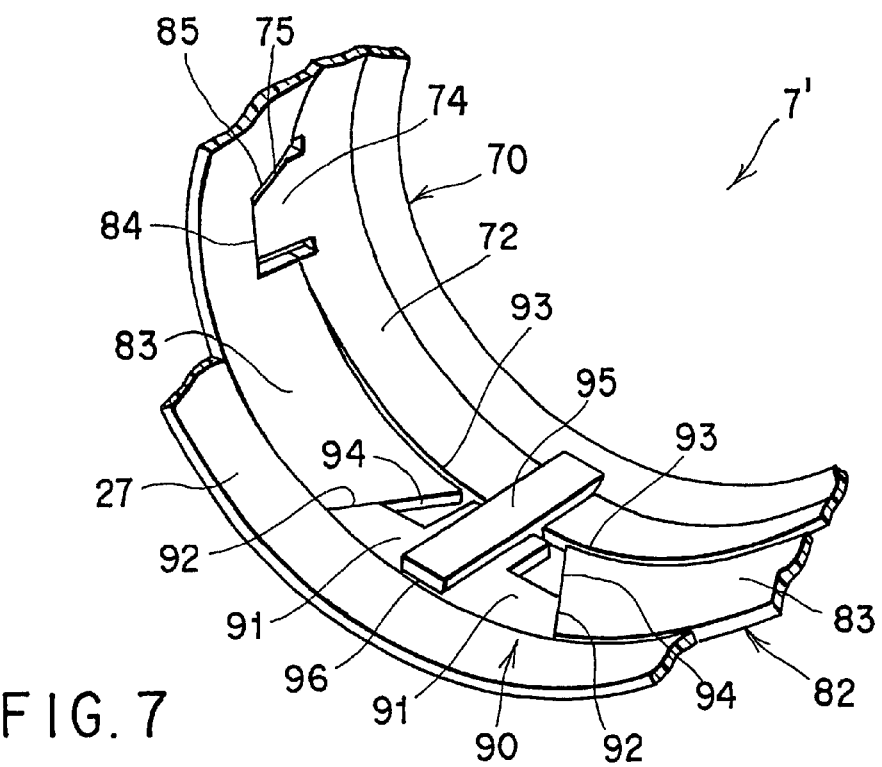
FIG. 7 is a partial oblique view showing the probe cover detaching mechanism according to another embodiment of the present invention.
Figure 8:
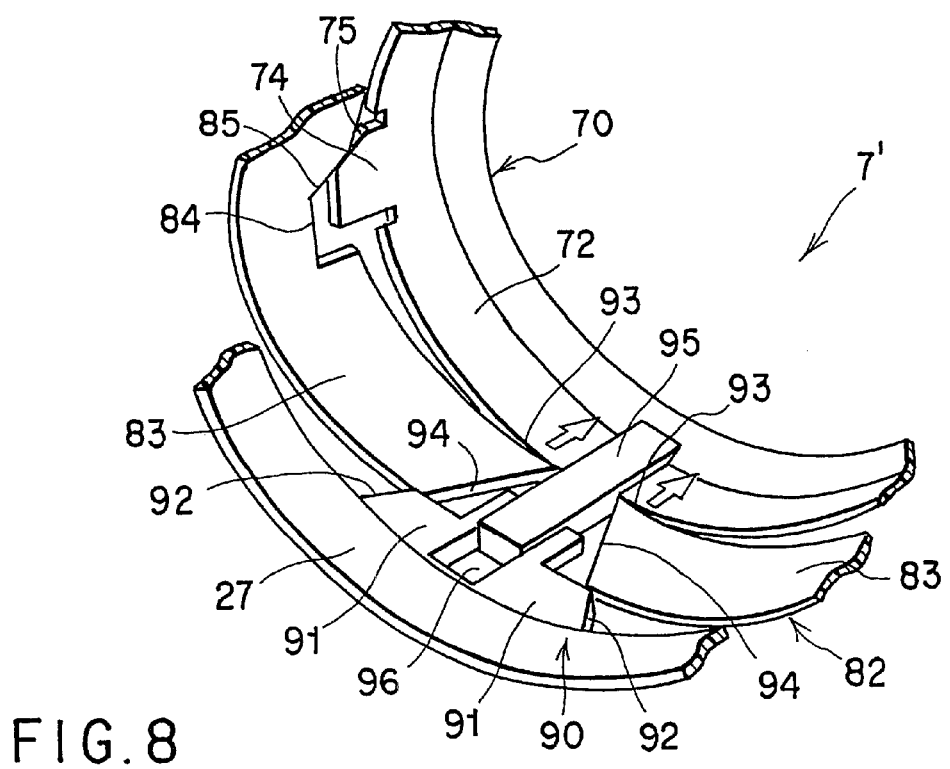
FIG. 8 is a partial oblique view showing the construction when the probe cover is detached from the probe cover detaching mechanism shown in FIG. 7.

FIGS. 7 and 8 are partial oblique views collectively showing another construction of a probe cover detaching mechanism 7'. The probe cover detaching mechanism 7' shown in FIGS. 7 and 8 is substantially equal in the basic construction to the probe cover detaching mechanism 7 described previously in detail with reference to FIGS. 3 to 6, except that the probe cover detaching mechanism 7' shown in FIGS. 7 and 8 further comprises an auxiliary means 90 for increasing the moving amount of the pushing member 70 toward the distal end. The auxiliary means 90 is formed mainly of a cam mechanism. The probe cover detaching mechanism 7' will now be described with an emphasis put on the auxiliary means 90.

In the probe cover detaching mechanism 7', it is desirable for a guide bar 95 extending from about the lower portion of the cylindrical portion 72 of the pushing member 70 toward the plate piece 83 to be formed integrally with the cylindrical portion 72. That portion of the guide bar 95 which extends from the cylindrical portion 72 has a thickness corresponding to the sum of the thickness of the cylindrical portion 72 and the thickness of that portion of the guide bar 95 which is positioned on the cylindrical portion 72 and is inserted into a guide groove 96 and regulated by the guide groove 96, as described herein later.

On the other hand, a pair of abutting portions 91 projecting toward the pushing member 70 are formed in the annular rib 27 formed in the support member 26, which is not shown in FIGS. 7 and 8 for the sake of brevity. It is desirable for these abutting portions 91 to be formed integrally with the annular rib 27. As apparent from the drawings, the guide groove 96 into which the guide bar 95 is inserted is defined between these abutting portions 91. The guide bar 95 is slidable along the guide groove 96 so as to move the pushing member 70 in the same direction. Also, inclined cam surfaces 92 are formed on the side surfaces of the abutting portions 91 on the opposite sides of the guide groove 96.

The free lower end surfaces of the two plate pieces 83 are positioned to face each other with the guide bar 95 interposed therebetween and constitute inclined surfaces 94 inclined in the direction same as the inclining direction of the corresponding cam surface 92.

As shown in FIG. 7, under the state before depression of the push button 81, e.g., the state shown in FIGS. 3 and 4, the projections 74, each of which has the inclined surface 75, are inserted into the corresponding recessed portions 84, and the inclined surfaces 94 of the two plate pieces 83 are in contact with or are positioned to face the cam surfaces 92 of the corresponding abutting portions 91.

If the push button 81 is depressed under this condition in the direction denoted by the arrow A in FIG. 6, the two plate pieces 83 are deformed (warped) to increase the curvature thereof so as to move downward the cam surface 85. In accordance with the downward movement of the cam surface 85, the projection 74 mating with the cam surface 85 is slid along the cam surface 85 via the inclined surface 75 so as to push the pushing member 70 toward the distal end. At the same time, the lower end portions of the two plate pieces 83 are moved closer to each other such that the inclined surfaces 94 at the lower free ends of the two plate pieces 83 are allowed to abut against the corresponding cam surfaces 92 so as to be slid along the cam surfaces 92. As a result, the lower end portions of the two plate pieces 83 are pushed toward the distal end, and side surfaces 93 of the edge portions on the side of the distal end of the two plate pieces 83 push the regions in the vicinity of the guide bar 95 of the cylindrical portion 72 of the pushing member 70 in the direction denoted by arrows in FIG. 8. In accordance with the movement of the cylindrical portion 72 toward the distal end, the guide bar 95 slides along the groove 96 while regulating the movement of the cylindrical portion 72 in the lateral direction. In this fashion, the pushing member 70 is pushed toward the distal end by the auxiliary means 90 even in the vicinity of the lower end portion so as to increase the moving amount of the pushing member 70 toward the distal end.

The probe cover abutting portion 71 pushes the proximal end portion 12 and the stepped portion 13 of the probe cover 10 in the same direction in accordance with the movement of the pushing member 70 toward the distal end, thereby releasing the engagement between the concave portion 15 and the convex portion 62 and, thus, pushing the probe cover 10 toward the distal end so as to detach the probe cover 10 from the probe 6, as in the embodiment described previously in conjunction with FIGS. 3 to 6.

Although the auxiliary means 90 has been described as being constructed by a cam mechanism, the construction of the auxiliary means is not limited to that shown in the drawings.

Figure 9:
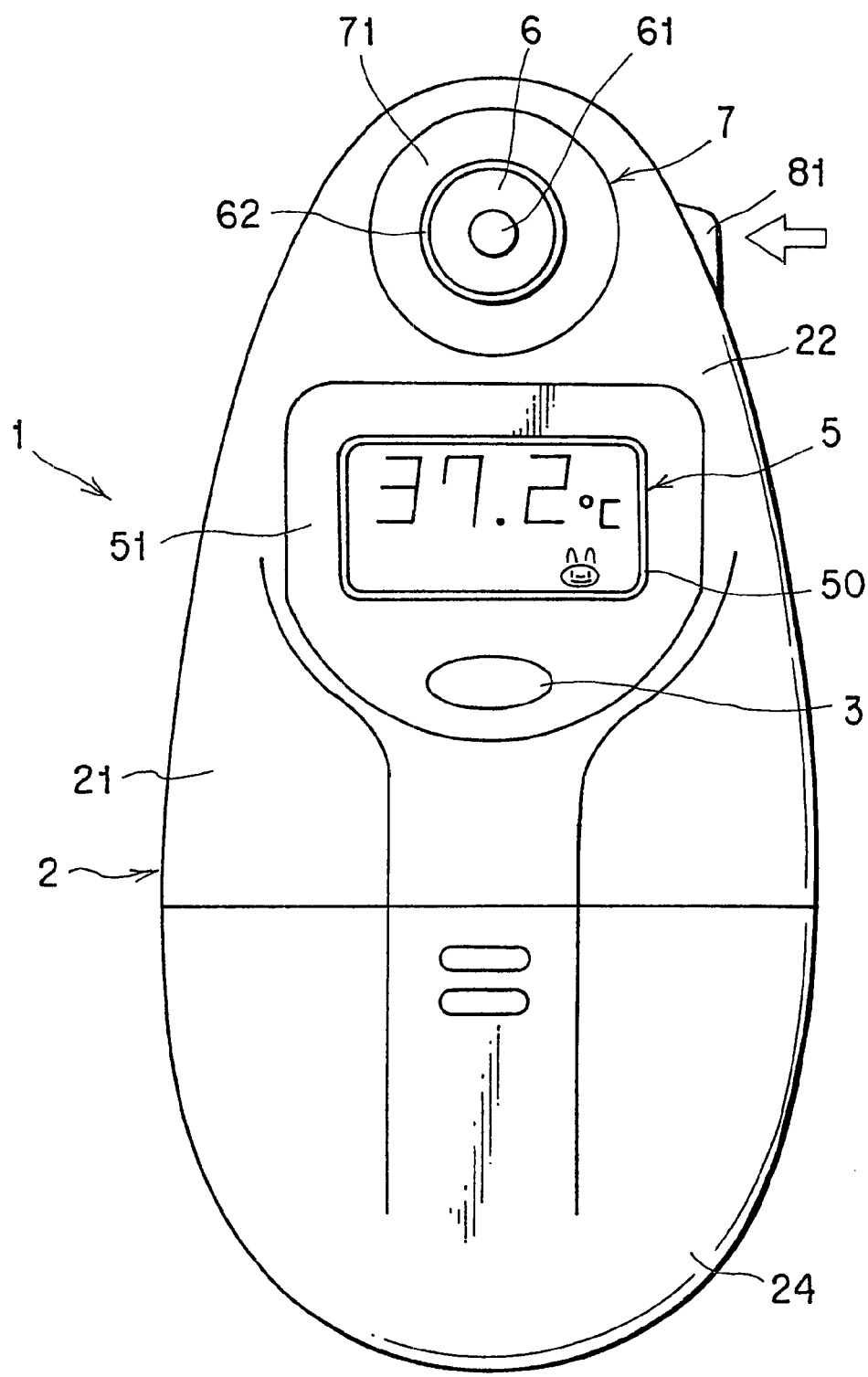
FIG. 9 is a front view showing an ear type clinical thermometer according to another embodiment of the present invention.
Figure 10:
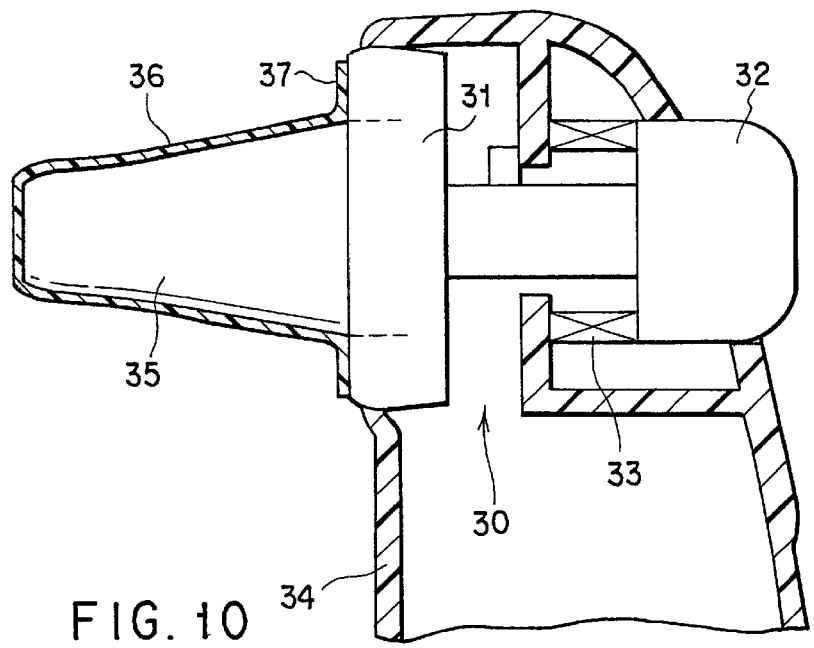
FIG. 10 is a side view, partly broken away, schematically showing the construction of the conventional probe cover mounting mechanism with the probe cover mounted.
Figure 11:
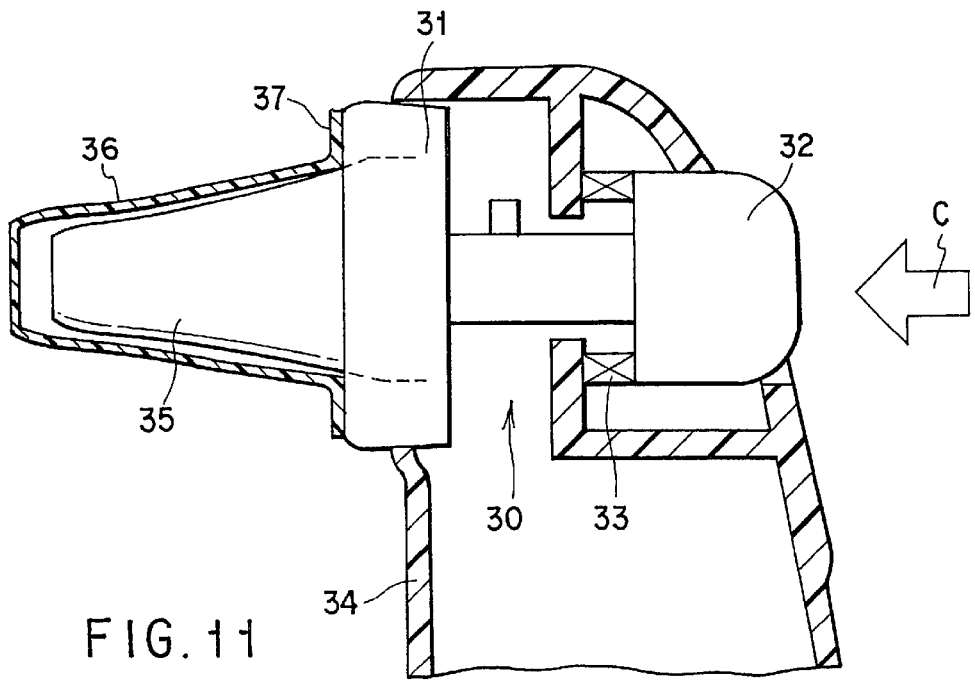
FIG. 11 is a partially sectional side view, partly broken away, schematically showing the construction when the probe cover is detached from the probe cover detaching mechanism shown in FIG. 10.

In the embodiments shown in FIGS. 1 to 8, the push button 81 is mounted to the upper end of the clinical thermometer body 2. However, it is also possible to mount the push button 81 on, for example, the right side surface (or left side surface) of the clinical thermometer body 2 as shown in FIG. 9 such that the depressing direction of the push button 81 is substantially perpendicular to the moving direction of the pushing member 70.

As described above, the present invention provides a probe cover detaching mechanism simple in construction, requiring a small mounting space, and capable of easily detaching the probe cover from the probe.

It should be noted in particular that the operating direction of the operating member is substantially perpendicular to the moving direction of the pushing member, making it possible to mount the push button of the operating member in an edge portion of the clinical thermometer body. As a result, the operating member does not occupy a large space on the backside of the probe and, thus, the particular space can be utilized effectively. For example, it is possible to arrange the switches such as the measuring switch on the back surface of the probe. Since a plurality of members for operation such as a button and a switch can be arranged in a concentrated fashion around the edge portion of the clinical thermometer body, it is possible to obtain an excellent operability.

It should also be noted that, since the probe cover detaching mechanism can be formed of two members, i.e., the pushing member and the operating member, the number of parts used is small so as to contribute to the miniaturization of the mechanism and the reduction of the manufacturing cost of the mechanism. In addition, the probe cover detaching mechanism can be assembled easily.

Further, in the case of mounting the auxiliary member, the moving amount of the pushing member can be increased so as to further ensure the operation of detaching the probe cover.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A probe cover detaching mechanism for detaching a probe cover mounted to abut against a probe that is to be inserted into an earhole from the probe, comprising:

an operating member to which is applied an operating force for detaching the probe cover from the probe;

a push member which pushes the probe cover toward the distal end of the probe upon receipt of the operating force applied to the operating member and transmitted from the operating member; and a mechanism joining the operating member and the push member, said mechanism changing the direction of the operating force applied to the operating member by substantially 90° so as to transmit the operating force to the push member.

2. The probe cover detaching mechanism according to claim 1, wherein said pushing member is mounted to the outer circumferential portion of the proximal end of the probe so as to be movable in the axial direction of the probe.

3. The probe cover detaching mechanism according to claim 1, wherein that portion of the pushing member which abuts against the probe cover is substantially in the shape of a truncated cone.

4. The probe cover detaching mechanism according to claim 1, wherein said operating force transmitting mechanism is a cam mechanism.

5. The probe cover detaching mechanism according to claim 4, wherein said cam mechanism comprises a tapered cam surface formed in said operating member and an inclined surface formed in said pushing member and mating with said cam surface.

6. The probe cover detaching mechanism according to claim 1, wherein said operating member comprises a push button and a deforming section that is elastically deformed upon depression of said push button and is constructed such that the push button is brought back to the original position by the elastic force of the deforming section.

7. The probe cover detaching mechanism according to claim 6, wherein said deforming section is formed of a pair of substantially semicircular arcuate plate pieces.

8. The probe cover detaching mechanism according to claim 6, wherein said push button and said deforming section are integrally formed.

9. The probe cover detaching mechanism according to claim 1, further comprising an auxiliary means for increasing the moving amount of said pushing member.

10. The probe cover detaching mechanism according to claim 9, wherein said auxiliary means is a cam mechanism.

11. An ear type clinical thermometer, comprising the probe cover detaching mechanism defined in claim 1.

12. The ear type clinical thermometer according to claim 11, wherein a measuring switch is mounted to the back surface of the probe cover detaching mechanism.

* * * * *